US012160042B2

(12) United States Patent
Kratzenberg et al.

(10) Patent No.: US 12,160,042 B2
(45) Date of Patent: Dec. 3, 2024

(54) METHOD OF MANUFACTURING A DIELECTRIC LENS

(71) Applicant: ASTRONICS AEROSAT CORPORATION, Manchester, NH (US)

(72) Inventors: Eric W. Kratzenberg, Peterborough, NH (US); Joseph A. Hoell, Jr., Dunbarton, NH (US); John W. Berrigan, Nashua, NH (US)

(73) Assignee: ASTRONICS AEROSAT CORPORATION, Manchester, NH (US)

(*) Notice: Subject to any disclaimer, the term of this patent is extended or adjusted under 35 U.S.C. 154(b) by 344 days.

(21) Appl. No.: 17/241,404

(22) Filed: Apr. 27, 2021

(65) Prior Publication Data

US 2021/0249781 A1 Aug. 12, 2021

Related U.S. Application Data

(63) Continuation of application No. 16/113,346, filed on Aug. 27, 2018, now Pat. No. 10,992,052.
(Continued)

(51) Int. Cl.
*H01Q 19/06* (2006.01)
*H01Q 13/02* (2006.01)
(Continued)

(52) U.S. Cl.
CPC ............. *H01Q 19/06* (2013.01); *H01Q 13/02* (2013.01); *H01Q 15/08* (2013.01); *H01Q 21/064* (2013.01)

(58) Field of Classification Search
CPC ........ H01Q 13/02; H01Q 15/08; H01Q 19/06; H01Q 21/064
See application file for complete search history.

(56) References Cited

U.S. PATENT DOCUMENTS

| | | |
|---|---|---|
| 390,350 A | 2/1888 | Denton |
| 2,692,336 A | 10/1954 | Kock |

(Continued)

FOREIGN PATENT DOCUMENTS

| | | |
|---|---|---|
| CH | 664848 A5 | 3/1988 |
| CN | 664848 | 3/1988 |

(Continued)

OTHER PUBLICATIONS

Storkus, Walter L., "Design Techniques for Compact Monopulse Antenna Feeds for W-Band Radar Systems," IEEE MTT-S International Microwave Symposium-Digest (1990) pp. 805-808.

*Primary Examiner* — Minh N Trinh
(74) *Attorney, Agent, or Firm* — Lando & Anastasi, LLP

(57) ABSTRACT

A method of manufacturing an antenna lens is disclosed. In one example the method includes forming a shell of a first material, the shell defining an interior cavity and having an internal and external shape corresponding to a shape of an antenna lens. The method further includes at least partially filling the cavity of the shell with a second material different from the first material and having a second dielectric constant higher than a first dielectric constant of the first material. The method includes settling the second material inside the cavity and sealing the shell to form the antenna lens with the second material inside the shell.

24 Claims, 5 Drawing Sheets

Related U.S. Application Data

(60) Provisional application No. 62/550,814, filed on Aug. 28, 2017.

(51) Int. Cl.
*H01Q 15/08* (2006.01)
*H01Q 21/06* (2006.01)

(56) References Cited

U.S. PATENT DOCUMENTS

| | | | | |
|---|---|---|---|---|
| 2,718,592 | A | 9/1955 | Smith | |
| 2,764,757 | A | 9/1956 | Rust et al. | |
| 2,884,629 | A | 4/1959 | Mason | |
| 2,908,002 | A | 10/1959 | Van | |
| 3,102,263 | A | 8/1963 | Meyer | |
| 3,329,958 | A | 7/1967 | Anderson | |
| 3,566,309 | A | 2/1971 | Ajioka | |
| 3,623,111 | A | 11/1971 | Provencher et al. | |
| 3,877,031 | A | 4/1975 | Mailloux et al. | |
| 4,210,915 | A | 7/1980 | Kienberger et al. | |
| 4,228,410 | A | 10/1980 | Goudey et al. | |
| 4,366,453 | A | 12/1982 | Schwarz | |
| 4,498,061 | A | 2/1985 | Morz et al. | |
| 4,640,280 | A * | 2/1987 | Sterzer | H01Q 19/062 219/688 |
| 4,654,622 | A | 3/1987 | Foss et al. | |
| 4,659,658 | A | 4/1987 | McCarthy et al. | |
| 4,673,943 | A | 6/1987 | Hannan | |
| 4,783,663 | A | 11/1988 | Rammos et al. | |
| 4,827,269 | A | 5/1989 | Shestag et al. | |
| 4,951,061 | A | 8/1990 | Lee | |
| 4,959,658 | A | 9/1990 | Collins | |
| 5,086,304 | A | 2/1992 | Collins | |
| 5,117,240 | A | 5/1992 | Anderson et al. | |
| 5,154,973 | A | 10/1992 | Imagawa et al. | |
| 5,166,698 | A | 11/1992 | Ashbaugh et al. | |
| 5,305,001 | A | 4/1994 | Wong et al. | |
| 5,359,338 | A | 10/1994 | Hatcher, Jr. et al. | |
| 5,905,457 | A | 5/1999 | Rashid | |
| 5,973,647 | A | 10/1999 | Barrett et al. | |
| 5,977,930 | A | 11/1999 | Fischer et al. | |
| 6,023,246 | A | 2/2000 | Tanabe | |
| 6,036,893 | A | 3/2000 | Lier et al. | |
| 6,201,508 | B1 | 3/2001 | Metzen et al. | |
| 6,208,307 | B1 | 3/2001 | Frisco et al. | |
| 6,307,523 | B1 | 10/2001 | Green et al. | |
| 6,366,244 | B1 | 4/2002 | Fernandes | |
| 6,388,621 | B1 | 5/2002 | Lynch | |
| 6,489,928 | B2 | 12/2002 | Sakurada | |
| 6,509,880 | B2 | 1/2003 | Sabet et al. | |
| 6,563,398 | B1 | 5/2003 | Wu | |
| 6,807,396 | B2 | 10/2004 | Horie et al. | |
| 6,950,073 | B2 | 9/2005 | Clymer et al. | |
| 6,990,639 | B2 | 1/2006 | Wilson | |
| 6,992,639 | B1 | 1/2006 | Lier | |
| 7,034,771 | B2 | 4/2006 | Rao et al. | |
| 7,403,166 | B2 | 7/2008 | Clymer et al. | |
| 7,423,604 | B2 | 9/2008 | Nagai | |
| 7,439,925 | B2 | 10/2008 | Huang et al. | |
| 7,564,421 | B1 | 7/2009 | Edwards et al. | |
| 7,565,421 | B2 | 7/2009 | Naruse | |
| 7,791,549 | B2 | 9/2010 | Clymer et al. | |
| 8,427,384 | B2 | 4/2013 | Clymer et al. | |
| 8,760,354 | B2 | 6/2014 | Clymer et al. | |
| 9,293,835 | B2 | 3/2016 | Clymer et al. | |
| 9,774,097 | B2 | 9/2017 | Clymer et al. | |
| 10,131,445 | B2 | 11/2018 | Ferguson et al. | |
| 10,992,052 | B2 * | 4/2021 | Kratzenberg | H01Q 13/02 |
| 2002/0067317 | A1 | 6/2002 | Sakurada | |
| 2004/0066345 | A1 | 4/2004 | Schadler | |
| 2006/0071876 | A1 | 4/2006 | Clymer et al. | |
| 2007/0001918 | A1 | 1/2007 | Ebling et al. | |
| 2007/0273599 | A1 | 11/2007 | Haziza | |
| 2010/0188304 | A1 | 7/2010 | Clymer et al. | |
| 2015/0123863 | A1 | 5/2015 | Legay et al. | |
| 2015/0266244 | A1 * | 9/2015 | Page | B29C 64/106 425/150 |
| 2016/0006129 | A1 | 1/2016 | Haziza | |
| 2018/0164430 | A1 | 6/2018 | Kuriyama et al. | |
| 2019/0310345 | A1 | 10/2019 | Nagaishi et al. | |

FOREIGN PATENT DOCUMENTS

| | | | |
|---|---|---|---|
| CN | 1031451 | A | 3/1989 |
| CN | 1680402 | A | 10/2005 |
| EP | 0390350 | A2 | 10/1990 |
| EP | 0390350 | B1 | 2/1995 |
| GB | 2108770 | A | 5/1983 |
| GB | 2208969 | A | 4/1989 |
| GB | 2232010 | A | 11/1990 |
| JP | 55-093106 | | 6/1980 |
| JP | 59-022403 | U | 2/1984 |
| JP | 62-58706 | | 3/1987 |
| JP | 04-150501 | A | 5/1992 |
| JP | 06061900 | A | 3/1994 |
| JP | 2004-179738 | A | 6/2004 |
| JP | 2005-536929 | A | 12/2005 |
| JP | 04150501 | B2 | 9/2008 |
| WO | 97/008775 | A1 | 3/1997 |
| WO | 2004019443 | A1 | 3/2004 |

* cited by examiner

METHOD OF MANUFACTURING A DIELECTRIC LENS

CROSS-REFERENCE TO RELATED APPLICATIONS

This application claims priority under 35 U.S.C. § 120 as a continuation of U.S. patent application Ser. No. 16/113,346, titled "DIELECTRIC LENS FOR ANTENNA SYSTEM," filed Aug. 27, 2018, U.S. Pat. No. 10,992,052, which claims the benefits under 35 U.S.C. § 119 (e) to U.S. Provisional Application No. 62/550,814 titled "DIELECTRIC LENS FOR ANTENNA SYSTEM," filed on Aug. 28, 2017. Each of these applications is herein incorporated by reference in its entirety for all purposes.

BACKGROUND

Conical horn antennas are commonly used in applications and systems where total antenna volume and antenna efficiency are important. For relatively small apertures, compared to wavelength, the horn antenna provides better efficiency than a reflector since there is no aperture blockage due to the feed. Further improved volume efficiency of the horn antenna can be achieved by having a wider flare angle of the horn; however the phase front of the radiated wave becomes curved and the efficiency drops as the flare angle gets wider. A dielectric lens may be used with a horn antenna to flatten the phase front of the radiated wave, increasing the efficiency while still maintaining a small volume. A drawback to a lensed horn is that the lens can be quite heavy. In addition, the lens moves the center of gravity far forward of the center of volume, forcing the mechanical support structure for the antenna system to be complicated and heavy.

SUMMARY OF THE INVENTION

Aspects and embodiments are directed to antenna lens structures, and antenna systems including the lens structures.

According to one embodiment an antenna lens apparatus includes a shell made of a first material having a first dielectric constant, the shell defining an interior cavity, and a second material disposed within and at least partially filling the cavity, the second material having a second dielectric constant higher than the first dielectric constant.

In certain examples the first material is polycarbonate, a thermoset, rigid translucent plastic produced by cross linking polystyrene with divinylbenzene, or polytetrafluoroethylene. In one example the second material is a powder. In one example the second material is a ceramic powder. The second material may be aluminum oxide or magnesium oxide, for example.

According to another embodiment, an antenna system comprises a horn antenna, and an antenna lens coupled to the horn antenna, the antenna lens including a shell made of a first material having a first dielectric constant, the shell defining an interior cavity, and a second material disposed within the cavity of the shell and having a second dielectric constant higher than the first dielectric constant.

The horn antenna may be a rectangular horn or a conical horn. The first material may be polycarbonate, a thermoset, rigid translucent plastic produced by cross linking polystyrene with divinylbenzene, or polytetrafluoroethylene, for example. In one example the second material is a powder. In one example the second material is a ceramic powder. The second material may be aluminum oxide or magnesium oxide, for example.

According to another embodiment a method of manufacture of an antenna lens comprises forming a shell of a first material, the shell defining an interior cavity and having an external shape corresponding to a shape of the antenna lens, at least partially filling the cavity of the shell with a powder, the powder being a second material different from the first material and having a second dielectric constant higher than a first dielectric constant of the first material, settling the powder inside the cavity, and sealing the shell to form the antenna lens with the powder inside the shell.

In one example forming the shell includes forming a hole in the shell, and filling the cavity of the shell with the powder includes pouring the powder into the cavity through the hole. The shell may be formed by extrusion, injection molding or 3D printing, for example. In one example settling the powder includes shaking the antenna lens on a shake table. In other examples settling the powder includes heating the powder, mechanically pressing the powder, or curing the powder.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment." "various embodiments." "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
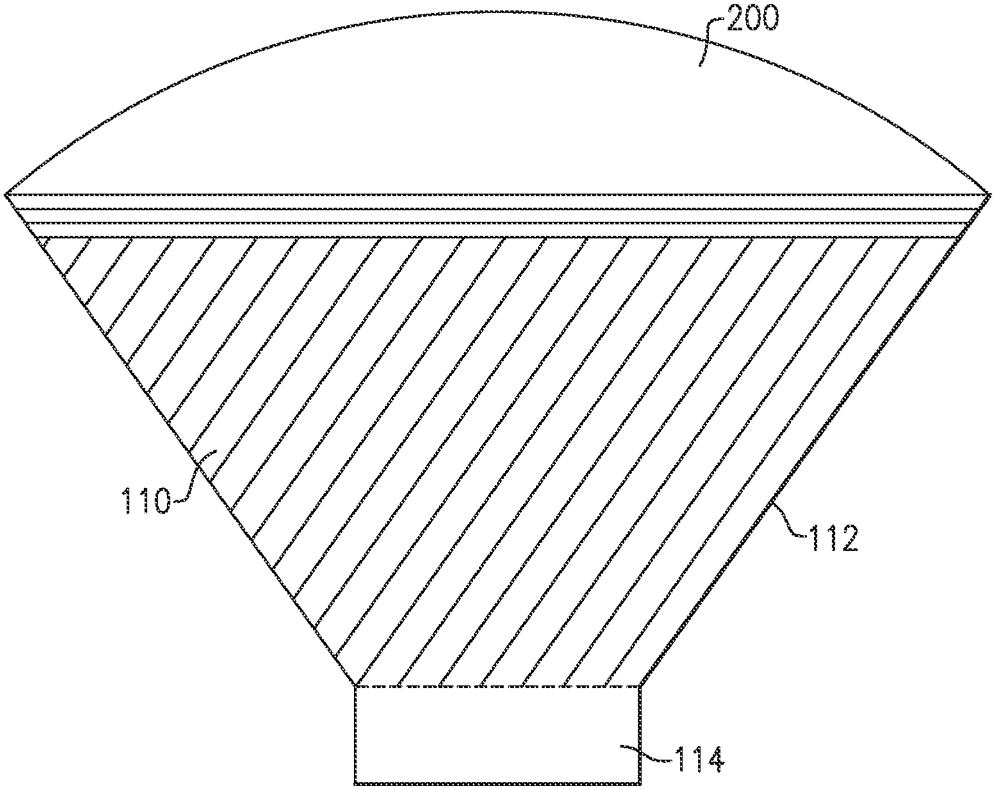
FIG. 1 is a diagram of one example of a lensed horn antenna according to aspects disclosed herein.

As discussed above, antenna systems can incorporate dielectric lenses. A dielectric lens for a horn antenna can typically be a single solid block of dielectric material that has a fairly low dielectric constant and very low loss. Examples of such dielectric materials include cross-linked polystyrene (such as the material available under the trademark “Rexolite,” which is a thermoset, rigid translucent plastic produced by cross linking polystyrene with divinylbenzene) and polytetrafluoroethylene (PTFE), which is a synthetic fluoropolymer of tetrafluoroethylene.

When electromagnetic energy is incident from air onto a dielectric material, part of the energy is reflected, as given by the reflection coefficient (G):

$$G=(1-n)/(1+n)$$

where n is the index of refraction of the dielectric material and e=n^2 is the dielectric constant of the dielectric material. Materials having low values of dielectric constant (air=1) will have small values of reflection, as shown by the above relationships. In many applications, lenses made from cross-linked polystyrene or PTFE do not require matching layers. However as materials with higher dielectric constants are used for the lenses, the reflection becomes significant, and it can be necessary or at least desirable to use matching layers to reduce the loss. Ideally the matching layer may have an optimum dielectric constant (e1) given by:

$$e1=\mathrm{sqrt}(e0*e2)$$

where e0 and e2 are the dielectric constants of the materials positioned on either side of the thin matching layer. If the dielectric lens is primarily made of a core material and air is on the other side of the matching layer (i.e., the matching layer is positioned between the core lens material and the air) then the ideal dielectric constant (e1) of the matching layer is the square root of the dielectric constant of the core material (since the dielectric constant of air is 1).

As the dielectric constant of the lens material increases, the thickness of the lens decreases, as does the volume of the lens. Lower volume is desirable for wide flare angle horns since the weight is generally less (depending on the materials used) and the center of gravity is moved closer to the center of volume, relieving some of the burden on the mechanical support structure. Materials such as Alumina and magnesium oxide, for example, offer higher dielectric constants (~10) as compared to the dielectric constants of a commonly-used cross-linked polystyrene (~2.5) or PTFE (~2.2), and exhibit extremely low loss. However, Alumina and magnesium oxide are both ceramic materials and are difficult to form or machine into complex shapes, such as lenses, due to the hardness of the materials. These ceramic materials are readily available as a high purity powder in variable particle sizes and may be used to modify the dielectric constants of resins and plastics.

Certain high dielectric lenses have been made with resin molded/machined cores and molded/machined matching layers; however these structures involve the use of multiple machining and molding steps, which is very costly. In addition, the resins used are usually significantly more lossy than, for example, pure Alumina.

In view of these disadvantages, aspects and embodiments may provide dielectric lens, and antenna systems including these lenses, that allow for the use of high dielectric constant materials to achieve a compact, low profile solution while avoiding complex and costly manufacturing processes. In particular, according to certain aspects and embodiments, an antenna lens has a structure that includes a thin outer shell made of a first matching layer material, the shell forming a cavity that can be filled with a second dielectric powder material. As discussed in more detail below, the dielectric powder material can have a relatively high dielectric constant, thereby allowing the volume of the lens to be relatively small, while the shell can both provide a matching layer function and provide the desired shape or structure for the lens. Accordingly, aspects and embodiments enable the construction of antenna lenses made of materials with desired dielectric constants, but which may be difficult or expensive to mold or machine and therefore conventionally have either been avoided or added significant cost and/or complexity to the antenna system.

An example of an antenna system including a dielectric lens in accord with certain embodiments is shown in FIG. 1. In this example, the antenna system includes a horn antenna 110 outlined by its horn walls 112, with a lens 200 positioned in the aperture of the horn antenna 110. In the illustrated example the horn antenna 110 is a circular horn antenna; however, those skilled in the art will appreciate that the horn antenna may be a rectangular horn antenna. The horn antenna terminates in an end 114 which can be configured to connect to, or be part of, a feed structure of the antenna system.

Figure 2A:
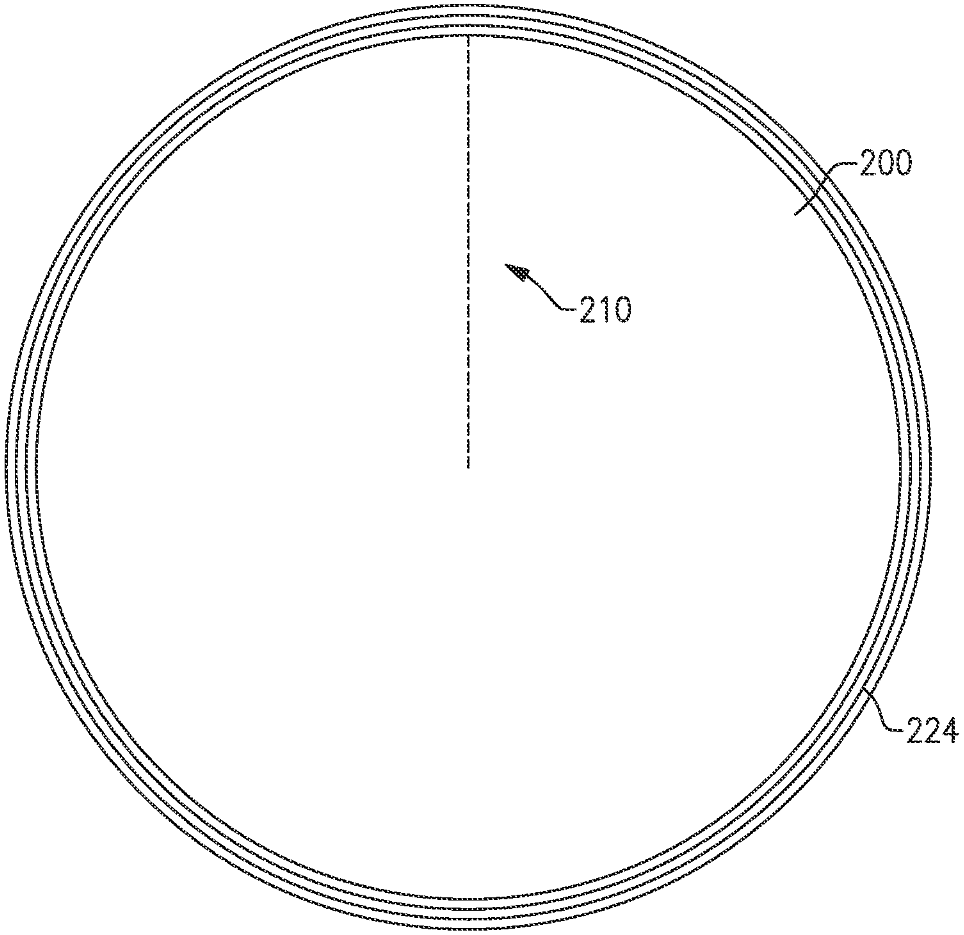
FIG. 2A is a plan view of one example of a dielectric lens according to aspects disclosed herein.
Figure 2B:
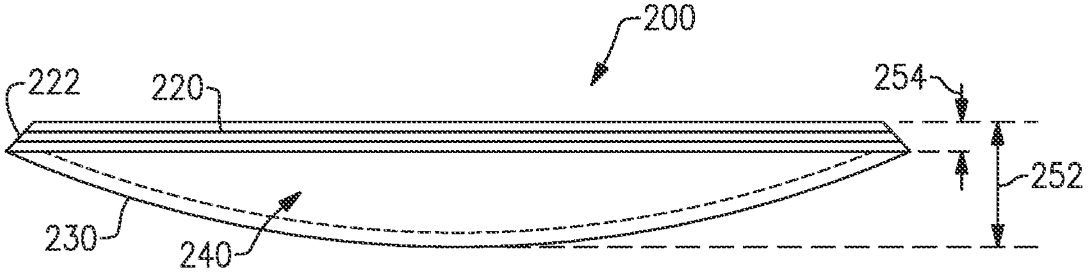
FIG. 2B is a cross-sectional view of the example of the dielectric lens shown in FIG. 2A.

FIG. 2A depicts a plan (“top-down”) view of an example of the dielectric lens 200 according to one embodiment. In this example the lens 200 is a circular lens having a lens radius 210; however, in other examples the lens may have a different shape, for example, based on the shape of the horn antenna with which it is to be used. FIG. 2B depicts a cross-sectional side view of the dielectric lens 200 of FIG. 2A. As shown in FIG. 2B, in this example the lens 200 has a plano-convex shape; however, the lens can be configured with other shapes. The lens 200 may include a tapered region 220 having angled sides 222, such that the tapered region of the lens can fit at least partially inside the aperture of the horn antenna 110. The angle of slant of the sides 222 of the lens 200 may match the angle of slant of the horn walls 112. The dielectric lens 200 may be sized and shaped depending on the size and shape of the horn antenna 110 with which it is intended to be used. In one example, the dielectric lens has a height 252 in a range of 1 to 2 inches, for example, 1.318 inches. In one example, the tapered region 220 has a height 254 of less than one inch, in a range of 0.1 to 0.5 inches, in a range of 0.1 to 0.25 inches, or 0.14 inches, for example. In certain example, the radius 210 may be several times the height of the lens. For example, the radius 210 may be in a range of 3 to 10 inches, 5 to 6 inches, etc. In one example the radius 210 is 5.58 inches.

As discussed above, the lens 200 includes an outer shell 230 made of a first dielectric material. The shell 230 defines a cavity 240 that is at least partially filled by a second (also referred to as “core”) dielectric material. The outer shell 230 can act as a matching layer for the core dielectric material. As shown in FIGS. 2A and 2B, in certain examples the outer shell 230 can include a plurality of ridges 224 or other surface features as may be needed to facilitate mounting the lens 200 to the horn antenna 110 and/or improve the matching function of the shell layer 230.

In certain embodiments, the core dielectric material is a material having a relatively high dielectric constant (e.g., ~10), such as Alumina or magnesium oxide, for example. As discussed above, these materials can be difficult to mold or machine into complex shapes, such as may be required to form an antenna lens. According to certain embodiments of the dielectric lens 200, the outer shell 230, which can be made from a material that is easy to mold or machine, defines the shape of the lens, and the core dielectric material can be provided in a powder form that at least partially fills the cavity 240 defined by the outer shell 230. Thus, the need to process the core dielectric material into a particular shape can be avoided.

Figure 3:
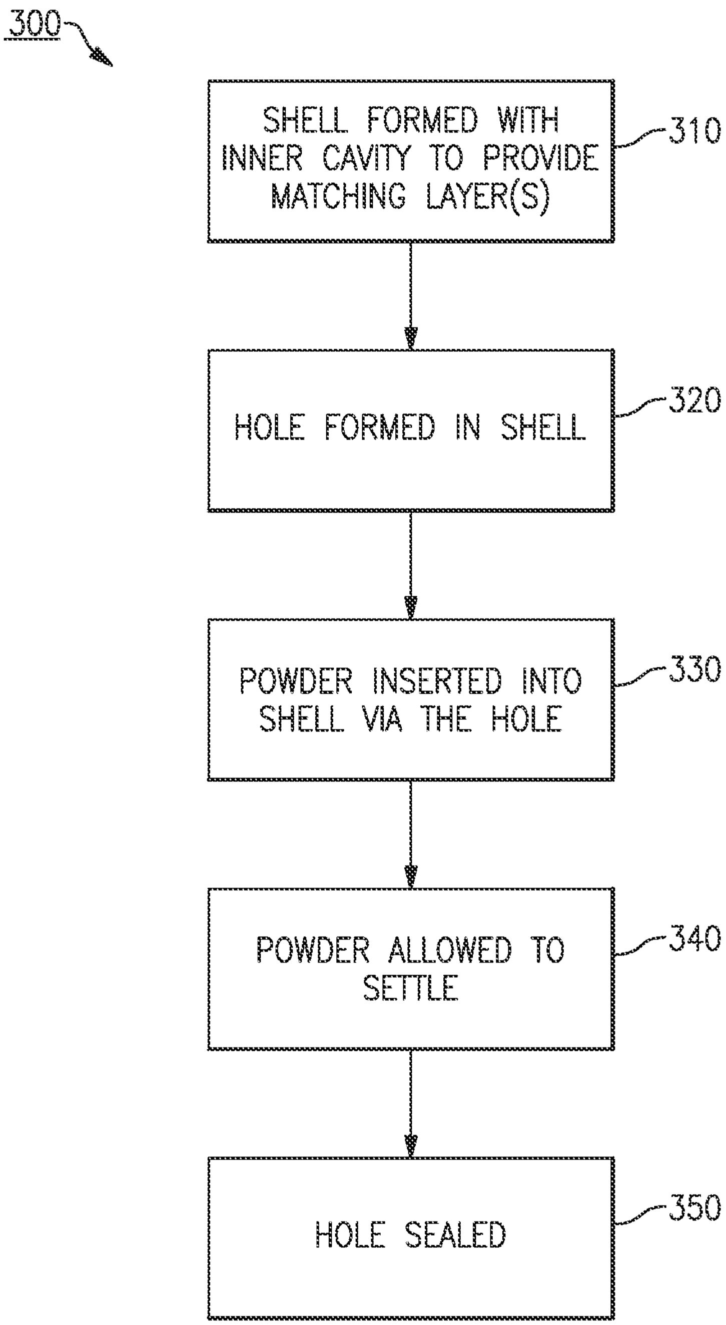
FIG. 3 is a flow diagram of one example of a method of manufacture for an antenna lens according to aspects disclosed herein.

FIG. 3 is a flow diagram illustrating one example of a method 300 for fabricating an antenna lens in accordance with one or more embodiments.

As shown in FIG. 3, at act 310 of the method 300, the lens shell 230 is created with an inner cavity 240, as discussed above, and also shown in FIG. 4. The shell 230 may be formed into the desired shape, and may include one or more layers of the same or different materials. As discussed above, in certain examples the shell may be constructed to act as a matching layer between the core dielectric material and air, and therefore the material(s) from which the shell is made may be selected accordingly. In certain examples, the shell 230 may be made of a polycarbonate material, such as PTFE or a thermoset, rigid plastic, for example. The shell 230 may be formed by any of a variety of manufacturing processes, such as machining, molding, material extrusion, or 3D printing, for example.

Figure 4:
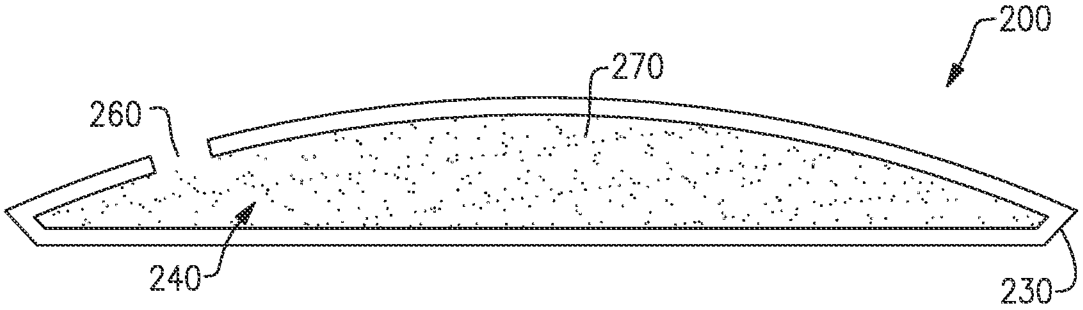
FIG. 4 is a cross-sectional view of one example of an antenna lens according to aspects disclosed herein.

At act 320, a hole 260 is made in the shell 230 of the lens 200 to allow the cavity 240 inside the shell to be accessed and filled with the core dielectric material 270. In some embodiments, the hole 260 can be formed in the shell 230 by drilling or otherwise creating the hole in the shell that is formed in act 310. In other embodiments, however, acts 310 and 320 may be combined, such that the shell 230 is formed (e.g., by machining, milling, 3D printing, or injection molding, for example) with the hole 260 in its surface. In FIG. 4 the hole 260 is shown in a region of the curved surface of the shell 230; however, the hole 260 may be formed anywhere in any surface of the shell 230.

As indicated in FIG. 3, at act 330, the shell 230 is at least partially filled with a dielectric powder 270 (the core dielectric material). In certain examples, the dielectric powder 270 may be made of aluminum oxide (Alumina), magnesium oxide, or another high quality ceramic powder. Act 330 of inserting the powder 270 into the shell 230 may include pouring the powder into the shell through the hole 20 and filling the entire cavity 240 or at least a portion of the cavity with the powder.

Still referring to FIG. 3, at act 340, the powder 270 is allowed to settle inside the cavity 240. In one example, the powder 270 may be settled by shaking the lens structure on a shake table. In some examples, the powder 270 may be settled by heating the powder, curing the powder, mechanically pressing or compacting the powder, or exposing the powder to radiation. After the powder 270 has settled, additional powder may be added to the cavity 240 (and allowed to settle) until the cavity has been filled to a desired degree.

At act 350, the hole 260 in the shell 230 is sealed after the cavity 240 has been filled with a desired amount of dielectric powder 270 and the powder has settled. Sealing the hole 260 prevents the powder 270 from coming out of the cavity 240. In certain examples act 350 can include permanently sealing the hole 260. For example, the hole 260 may be sealed by machining or extruding an amount of the shell material to cover and seal the hole. In other examples, a stopper can be inserted into the hole 260 to seal the hole. The stopper may be removeable such that the cavity 240 can be reopened, or the stopper can be permanently fixed within the hole 260, for example, using a scaling adhesive.

Thus, aspects and embodiments may provide an antenna lens that can advantageously have relatively low volume and weight by allowing the use of high dielectric constant materials with manufacturing methods that may be relatively simple and low-cost. Embodiments of the antenna lens can be used with a horn antenna to provide an antenna system, as discussed above. In certain examples, the antenna system can include a single horn antenna and corresponding lens. In other examples, the antenna system can include multiple horn antennas connected together to form an array, each horn antenna having an associated dielectric lens according to aspects disclosed herein.

Figure 5:
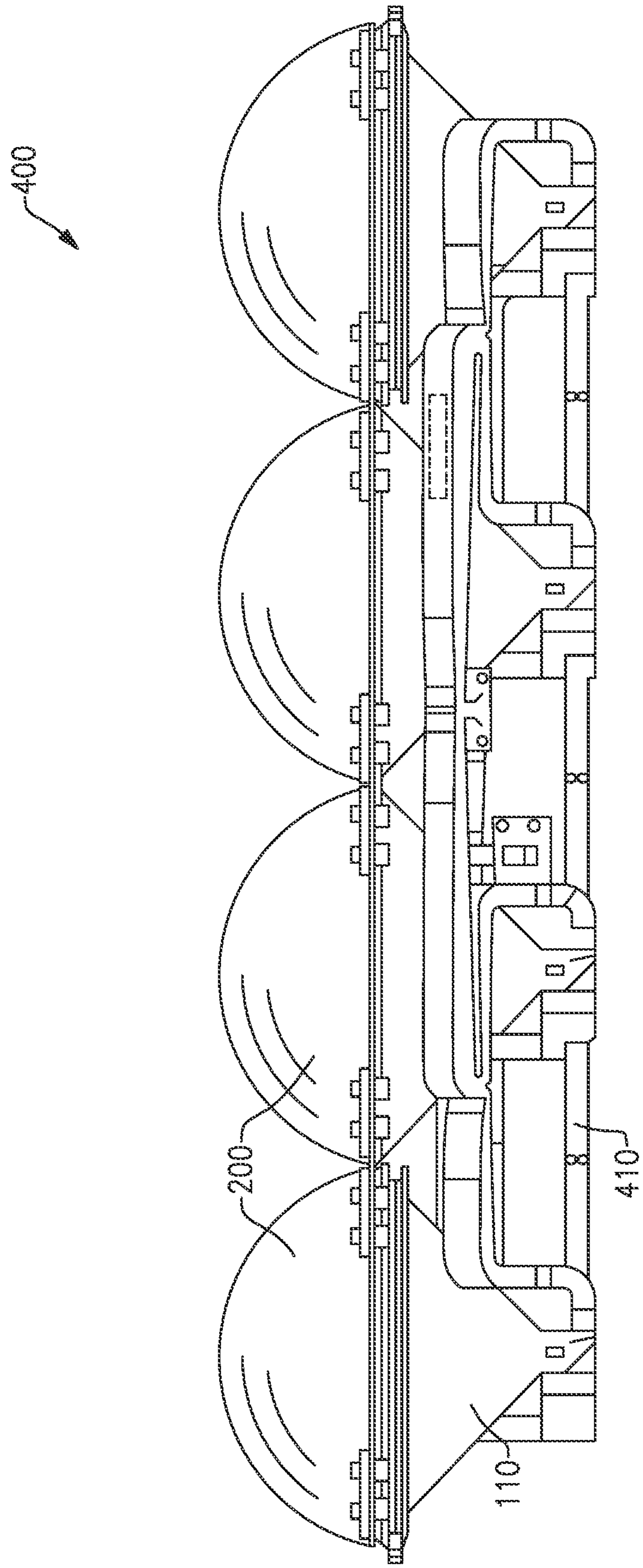
FIG. 5 is a diagram of one example of an antenna system according to aspects disclosed herein.

For example, FIG. 5 illustrates an example of an antenna system 400 that includes a plurality of horn antennas 110 each having a dielectric lens 200 coupled to the respective horn antenna. In FIG. 5, conical horn antennas are depicted; however, as discussed above, other horn antenna shapes can be used. The horn antennas 110 are connected together by a feed network 410. The antenna system 400 can be used in a communications system, and may be mounted to aircraft or land vehicles, for example.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Embodiments of the optical system are not limited in application to the details of construction and the arrangement of components set forth in the above description or illustrated in the accompanying drawings, and are capable of implementation in various ways. Examples of specific implementations are provided herein for illustrative purposes only and are not intended to be limiting. Also, the phraseology and terminology used herein are for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the invention should be determined from proper construction of the appended claims, and their equivalents.

What is claimed is:

1. A method of manufacture of an antenna lens including a first material having a first dielectric constant and second material having a second dielectric constant to control refraction of radio frequency (RF) energy, control impedance and maximize RF energy transmission, the method comprising:
- forming a shell of the first material, the shell defining an interior cavity and having an internal and external shape corresponding to a shape of the antenna lens;
- at least partially filling the interior cavity of the shell with the second material different from the first material and having the second dielectric constant higher than the first dielectric constant of the first material;
- settling the at least partially filled second material inside the interior cavity; and
- sealing the shell to form the antenna lens with the second material inside the shell.

2. The method of claim 1, wherein forming the shell includes forming a hole in the shell, and wherein the at least partially filling the interior cavity of the shell with the second material includes pouring the second material into the interior cavity through the hole.

3. The method of claim 1, wherein forming the shell includes forming the shell by any one of extrusion, injection molding, subtractive fabrication and additive fabrication.

4. The method of claim 1, wherein the second material is a powder and settling the powder includes shaking the antenna lens on a shake table.

5. The method of claim 1, wherein the second material is a powder and settling the powder includes any one of heating the powder, mechanically pressing the powder, and curing the powder.

6. The method of claim 1, wherein the at least partially filling the shell with the second material includes at least partially filling the shell with one of a liquid and powder material different from the first material having the second dielectric constant higher than the dielectric constant of the first material and wherein the liquid is configured to flow to conform to the internal shape of the shell.

7. The method of claim 1, wherein the at least partially filling the shell with the second material includes at least partially filling the shell with only a ceramic powder material.

8. The method of claim 7, wherein the ceramic powder material includes one of aluminum oxide and magnesium oxide.

9. The method of claim 1, wherein settling the second material includes settling the second material without using a resin.

10. The method of claim 1, wherein settling the material further includes at least one of packing and curing the second material inside the interior cavity resulting in the second material having a dielectric constant higher than the dielectric constant of the first material.

11. The method of claim 10, wherein settling the second material inside the shell further results in the antenna lens having at least three dielectric constants.

12. The method of claim 1, wherein forming the shell includes forming the shell of two halves of differing dielectric constant and joining the two halves by one of mechanical and chemical means into a single shell.

13. The method of claim 1, wherein forming the shell includes forming the shell with the first material that is one of a formable and machinable rigid material with a lower dielectric than the second material.

14. The method of claim 1, wherein forming the shell of the antenna lens includes forming the shell with a tapered region having angled sides such that the tapered region of the antenna lens is configured to fit at least partially inside an aperture of a horn antenna element, and forming the angled sides with a slant angle of the angled sides of the antenna lens that matches a slant angle of walls of the horn antenna element.

15. The method of claim 1, wherein forming the shell of the antenna lens includes forming the antenna lens with a height in a range of 1 to 2 inches.

16. The method of claim 1, wherein forming the shell of the antenna lens includes forming the antenna lens with a radius that is in a range of 3 inches to 6 inches.

17. The method of claim 1, wherein forming the shell of the antenna lens includes forming the shell with a plano-convex shape.

18. The method of claim 1, wherein forming the shell of the first material includes forming the shell of one of polycarbonate, a thermoset, rigid translucent plastic produced by cross linking polystyrene with divinylbenzene, and polytetrafluoroethylene.

19. The method of claim 1, wherein the at least partially filling the shell with the second material includes at least partially filling the shell with a liquid and settling the second material inside the interior cavity includes settling the liquid by one or more of thermal curing and chemical curing.

20. The method of claim 1, wherein forming the shell includes separately forming and bonding together the shell from a front shell and a back shell to form a single shell, the front shell being formed from the first material and the back shell being formed from a third material with a third dielectric constant.

21. The method of claim 20, wherein the front shell includes a front shell exterior surface and a front shell interior surface and the back shell includes a back shell interior surface and a back shell exterior surface, and forming the one or more the front shell exterior surface, the front shell interior surface, the back shell interior surface and the back shell exterior surface with at least one of a ridge and pattern.

22. A method of manufacture of an antenna lens including a first material having a first dielectric constant and second material having a second dielectric constant to control refraction of radio frequency (RF) energy, control impedance and maximize RF energy transmission, the method comprising:

forming a shell of the first material, the shell defining an interior cavity and having an internal and external shape corresponding to a shape of the antenna lens;

at least partially filling the interior cavity of the shell with the second material different from the first material and having the second dielectric constant higher than the first dielectric constant of the first material;

settling the at least partially filled second material inside the interior cavity;

sealing the shell to form the antenna lens with the at least partially filled second material inside the shell; and wherein forming the shell to provide the desired refraction includes forming a surface of the shell with at least one of a ridge and pattern to create additional dielectric layers to provide impedance matching.

23. The method of claim 22, further comprising forming at least one of the ridge and pattern so that a combination of the first material, the second material and an external environment provide additional dielectric constant layers at boundaries of the shell, thereby providing up to four separate additional dielectric layers; and wherein the at least one of the ridge and pattern may be formed in order to tailor the dielectric constant of the layers of the shell.

24. A method of manufacture of an antenna lens including a first material having a first dielectric constant and second material having a second dielectric constant to control refraction of radio frequency (RF) energy, control impedance and maximize RF energy transmission, the method comprising:

forming a shell of the first material, the shell defining an interior cavity and having an internal and external shape corresponding to a shape of the antenna lens;

at least partially filling the interior cavity of the shell with the second material different from the first material and having the second dielectric constant higher than the first dielectric constant of the first material;

settling the at least partially filled second material inside the interior cavity;

sealing the shell to form the antenna lens with the at least partially filled second material inside the shell; and wherein the forming the shell includes forming the shell with mounting features that are configured to provide for attachment of the antenna lens to an antenna horn.

* * * * *